(12) United States Patent
Miyamoto et al.

(10) Patent No.: US 12,222,295 B2
(45) Date of Patent: Feb. 11, 2025

(54) OPTICAL SORTER

(71) Applicant: SATAKE CORPORATION, Tokyo (JP)

(72) Inventors: Tomoyuki Miyamoto, Tokyo (JP); Masaaki Sadamaru, Tokyo (JP); Hiroaki Takeuchi, Tokyo (JP); Tadashi Matsushita, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 261 days.

(21) Appl. No.: 17/781,795

(22) PCT Filed: Dec. 14, 2020

(86) PCT No.: PCT/JP2020/046552
§ 371 (c)(1),
(2) Date: Jun. 2, 2022

(87) PCT Pub. No.: WO2021/125133
PCT Pub. Date: Jun. 24, 2021

(65) Prior Publication Data
US 2022/0373472 A1  Nov. 24, 2022

(30) Foreign Application Priority Data

Dec. 18, 2019 (JP) .................... 2019-228696
Dec. 26, 2019 (JP) .................... 2019-236000
Jul. 3, 2020 (JP) .................... 2020-115957

(51) Int. Cl.
*G01N 21/88* (2006.01)
*B07C 5/342* (2006.01)
*G01N 21/85* (2006.01)

(52) U.S. Cl.
CPC ....... *G01N 21/8806* (2013.01); *B07C 5/3425* (2013.01); *G01N 2021/8592* (2013.01); *G01N 2021/8845* (2013.01)

(58) Field of Classification Search
CPC ............... G01N 21/8806; G01N 21/85; G01N 2021/8845; G01N 2021/8592;
(Continued)

(56) References Cited

U.S. PATENT DOCUMENTS 4,630,736 A * 12/1986 Maughan ................ B07C 5/366
209/587
5,026,982 A * 6/1991 Stroman ................. B07C 5/342
250/221

(Continued)

FOREIGN PATENT DOCUMENTS

CN       1419969 A        5/2003
CN     101887030 A  *   11/2010
(Continued)

OTHER PUBLICATIONS

International Search Report corresponding to International Application No. PCT/JP2020/046552 mailed Jan. 26, 2021, in English.
(Continued)

*Primary Examiner* — Hoa Q Pham
(74) *Attorney, Agent, or Firm* — Renner, Otto, Boisselle & Sklar, LLP

(57) ABSTRACT

An optical sorter includes a first light source disposed on a first side, a second light source disposed on a second side, an optical sensor configured to detect light during a plurality of scan periods including a first scan period and a second scan period, a determination part configured to determine a foreign object and/or a defective product, and a light source control part. The light source control part is configured to control the first light source and the second light source (Continued)

during the first scan period so as to turn on the first light source and/or the second light source in a first lighting pattern, which is a lighting pattern arbitrarily selected from a lighting pattern in which the first light source and the second light source are at least partially on, a lighting pattern in which only one of the first light source and the second light source is at least partially on, and a lighting pattern in which only the other of the first light source and the second light source is at least partially on, and is also configured to control the first light source and the second light source during the second scan period so as to turn on the first light source and/or the second light source in a second lighting pattern, which is a lighting pattern selected arbitrarily except for the first lighting pattern.

10 Claims, 9 Drawing Sheets

(58) Field of Classification Search
CPC ..... B07C 5/3422; B07C 5/3425; B07C 5/366; B07C 5/342; B07C 5/363; B07C 5/365; B07C 5/368; B07C 2501/00; B07C 2501/0018; B65G 11/00–206
USPC ........... 356/432–440, 425, 335–343; 209/44, 209/580, 587; 250/223 R, 226
See application file for complete search history.

(56) References Cited

U.S. PATENT DOCUMENTS

| | | | |
|---|---|---|---|
| 9,863,871 B2* | 1/2018 | Tagawa | G01N 21/85 |
| 10,034,490 B2* | 7/2018 | Davis | B07C 5/3425 |
| 11,969,765 B2* | 4/2024 | Kawamura | B07C 5/366 |
| 12,023,715 B2* | 7/2024 | Miyamoto | B07C 5/3425 |
| 2003/0098978 A1 | 5/2003 | Ikeda et al. | |
| 2007/0012604 A1* | 1/2007 | Basford | B07C 5/368 209/644 |
| 2014/0226163 A1* | 8/2014 | Hug | G01N 21/85 356/445 |
| 2023/0009210 A1* | 1/2023 | Miyamoto | G01N 21/85 |
| 2023/0333025 A1* | 10/2023 | Matsushita | G01N 21/85 |

FOREIGN PATENT DOCUMENTS

| | | |
|---|---|---|
| CN | 106053342 A | 10/2016 |
| EP | 1314489 A2 | 5/2003 |
| JP | 2008-302314 A | 12/2008 |
| JP | 2010-042326 A | 2/2010 |
| JP | 2016-197065 A | 11/2016 |
| JP | 2003-205269 A | 7/2022 |

OTHER PUBLICATIONS

Written Opinion corresponding to International Application No. PCT/JP2020/046552 mailed Jan. 26, 2021, Japanese only.
Indian Office Action for corresponding Application No. 202217040035, issued Feb. 27, 2024, with English translation.
International Preliminary Report on Patentability corresponding to International Application No. PCT/JP2020/046552, mailed May 17, 2022 with English translation.
Chinese Office Action for corresponding Application No. 202080087328.5, issued May 16, 2024, with English translation.
Japanese Office Action for corresponding Application No. 2020-115957, issued Jun. 10, 2024, with English translation.

* cited by examiner

FIG. 4

| SCAN NUMBER | | | 1 | 2 | 3 | 4 | 5 | 6 | 7 | 8 |
|---|---|---|---|---|---|---|---|---|---|---|
| LIGHT SOURCE | FRONT | R | ON/OFF | | | | | | | |
| | | G, B | | | | | | | | |
| | REAR | R | | | | | | | | |
| | | G, B | | | | | | | | |
| OPTICAL SENSOR | FRONT | R | REFLECTED AND TRANSMITTED IMAGE | REFLECTED IMAGE | TRANSMITTED IMAGE | REFLECTED AND TRANSMITTED IMAGE | REFLECTED IMAGE | TRANSMITTED IMAGE | REFLECTED AND TRANSMITTED IMAGE | REFLECTED IMAGE |
| | | G, B | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |
| | REAR | R | REFLECTED AND TRANSMITTED IMAGE | TRANSMITTED IMAGE | REFLECTED IMAGE | REFLECTED AND TRANSMITTED IMAGE | TRANSMITTED IMAGE | REFLECTED IMAGE | REFLECTED AND TRANSMITTED IMAGE | TRANSMITTED IMAGE |
| | | G, B | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |

FIG. 5

| SCAN NUMBER | | | 1 | 2 | 3 | 4 | 5 | 6 | 7 | 8 |
|---|---|---|---|---|---|---|---|---|---|---|
| LIGHT SOURCE | FRONT | R | ON | OFF | | | | | | |
| | | G, B | | | | | | | | |
| | REAR | R | | | | | | | | |
| | | G, B | | | | | | | | |
| OPTICAL SENSOR | FRONT | R | REFLECTED AND TRANSMITTED IMAGE | REFLECTED IMAGE | REFLECTED AND TRANSMITTED IMAGE | TRANSMITTED IMAGE | REFLECTED AND TRANSMITTED IMAGE | REFLECTED IMAGE | REFLECTED AND TRANSMITTED IMAGE | TRANSMITTED IMAGE |
| | | G, B | REFLECTED AND TRANSMITTED IMAGE | TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |
| | REAR | R | REFLECTED AND TRANSMITTED IMAGE | TRANSMITTED IMAGE | REFLECTED AND TRANSMITTED IMAGE | REFLECTED IMAGE | REFLECTED AND TRANSMITTED IMAGE | TRANSMITTED IMAGE | REFLECTED AND TRANSMITTED IMAGE | REFLECTED IMAGE |
| | | G, B | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |

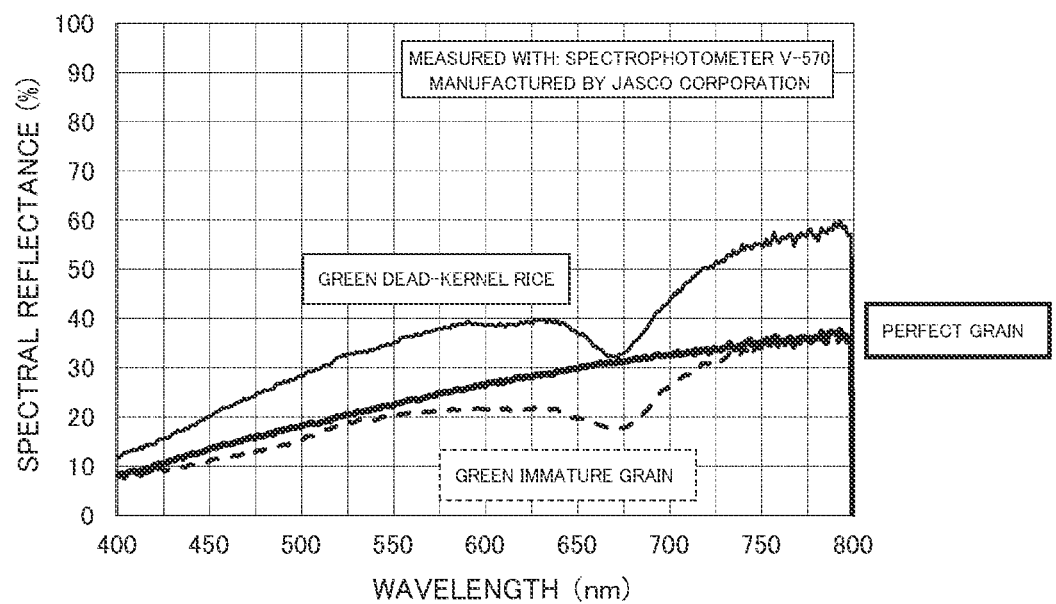

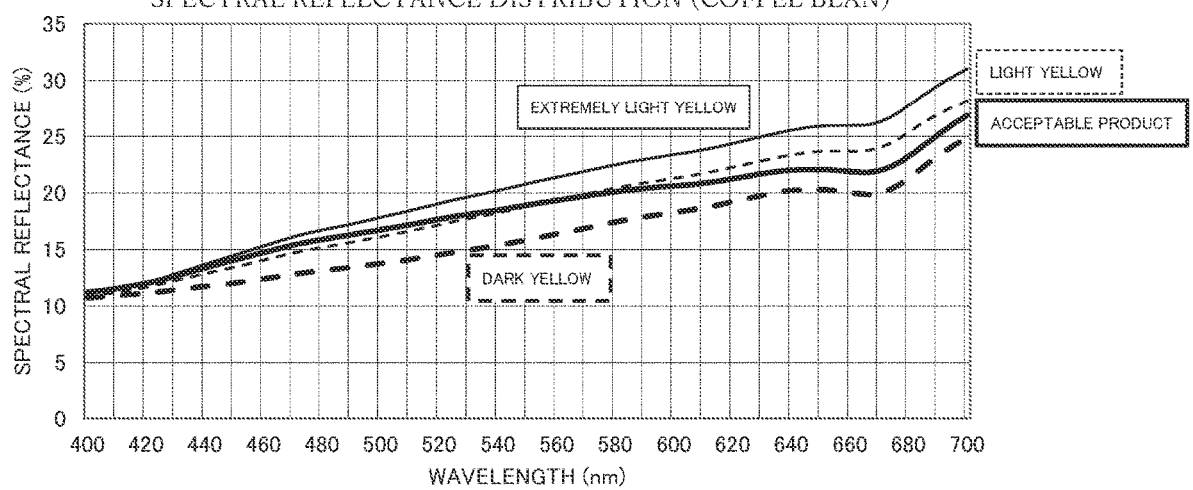

FIG. 8

| SCAN NUMBER | | | 1 | 2 | 3 | 4 | 5 | 6 | 7 | 8 |
|---|---|---|---|---|---|---|---|---|---|---|
| LIGHT SOURCE | FRONT | R | ON / OFF | | | | | | | |
| | | G, B | | | | | | | | |
| | REAR | R | | | | | | | | |
| | | G, B | | | | | | | | |
| OPTICAL SENSOR | FRONT | R | REFLECTED AND TRANSMITTED IMAGE | REFLECTED IMAGE | REFLECTED AND TRANSMITTED IMAGE | REFLECTED IMAGE | REFLECTED AND TRANSMITTED IMAGE | REFLECTED IMAGE | REFLECTED AND TRANSMITTED IMAGE | REFLECTED IMAGE |
| | | G, B | REFLECTED AND TRANSMITTED IMAGE | TRANSMITTED IMAGE | REFLECTED AND TRANSMITTED IMAGE | TRANSMITTED IMAGE | REFLECTED AND TRANSMITTED IMAGE | TRANSMITTED IMAGE | REFLECTED AND TRANSMITTED IMAGE | TRANSMITTED IMAGE |
| | REAR | R | REFLECTED AND TRANSMITTED IMAGE | TRANSMITTED IMAGE | REFLECTED AND TRANSMITTED IMAGE | TRANSMITTED IMAGE | REFLECTED AND TRANSMITTED IMAGE | TRANSMITTED IMAGE | REFLECTED AND TRANSMITTED IMAGE | TRANSMITTED IMAGE |
| | | G, B | REFLECTED AND TRANSMITTED IMAGE | REFLECTED IMAGE | REFLECTED AND TRANSMITTED IMAGE | REFLECTED IMAGE | REFLECTED AND TRANSMITTED IMAGE | REFLECTED IMAGE | REFLECTED AND TRANSMITTED IMAGE | REFLECTED IMAGE |
| CALCULATION | FRONT R | | TRANSMITTED IMAGE (REFLECTED AND TRANSMITTED IMAGE) − REFLECTED IMAGE | REFLECTED AND TRANSMITTED IMAGE − TRANSMITTED IMAGE | TRANSMITTED IMAGE (REFLECTED AND TRANSMITTED IMAGE) − REFLECTED IMAGE | REFLECTED AND TRANSMITTED IMAGE − TRANSMITTED IMAGE | TRANSMITTED IMAGE (REFLECTED AND TRANSMITTED IMAGE) − REFLECTED IMAGE | REFLECTED AND TRANSMITTED IMAGE − TRANSMITTED IMAGE | TRANSMITTED IMAGE (REFLECTED AND TRANSMITTED IMAGE) − REFLECTED IMAGE | REFLECTED AND TRANSMITTED IMAGE − TRANSMITTED IMAGE |
| | REAR R | | REFLECTED IMAGE (REFLECTED AND TRANSMITTED IMAGE) − TRANSMITTED IMAGE | REFLECTED AND TRANSMITTED IMAGE − REFLECTED IMAGE | REFLECTED IMAGE (REFLECTED AND TRANSMITTED IMAGE) − TRANSMITTED IMAGE | REFLECTED AND TRANSMITTED IMAGE − REFLECTED IMAGE | REFLECTED IMAGE (REFLECTED AND TRANSMITTED IMAGE) − TRANSMITTED IMAGE | REFLECTED AND TRANSMITTED IMAGE − REFLECTED IMAGE | REFLECTED IMAGE (REFLECTED AND TRANSMITTED IMAGE) − TRANSMITTED IMAGE | REFLECTED AND TRANSMITTED IMAGE − REFLECTED IMAGE |

| SCAN NUMBER | | | 1 | 2 | 3 | 4 | 5 | 6 | 7 | 8 |
|---|---|---|---|---|---|---|---|---|---|---|
| LIGHT SOURCE | FRONT | R | ON | OFF | | | | | | |
| | | G, B | | | | | | | | |
| | REAR | R | | | | | | | | |
| | | G, B | | | | | | | | |
| OPTICAL SENSOR | FRONT | R | REFLECTED IMAGE | TRANSMITTED IMAGE | REFLECTED IMAGE | TRANSMITTED IMAGE | REFLECTED IMAGE | TRANSMITTED IMAGE | REFLECTED IMAGE | TRANSMITTED IMAGE |
| | | G, B | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |
| | REAR | R | TRANSMITTED IMAGE | REFLECTED IMAGE | TRANSMITTED IMAGE | REFLECTED IMAGE | TRANSMITTED IMAGE | REFLECTED IMAGE | TRANSMITTED IMAGE | REFLECTED IMAGE |
| | | G, B | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE | REFLECTED AND TRANSMITTED IMAGE |
| CALCULATION | FRONT R | | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) | REFLECTED AND TRANSMITTED IMAGE (REFLECTED IMAGE + TRANSMITTED IMAGE) |
| | REAR R | | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) | REFLECTED AND TRANSMITTED IMAGE (TRANSMITTED IMAGE + REFLECTED IMAGE) |

OPTICAL SORTER

This application is a national phase of International Application No. PCT/JP2020/046552 filed Dec. 14, 2020, which claims the priority of Japanese Patent Application JP2019-228696 filed Dec. 18, 2019, Japanese Patent Application JP2019-236000 filed Dec. 26, 2019 and JP2020-115957 filed Jul. 3, 2020, all of which are hereby incorporated herein by reference in their entireties.

TECHNICAL FIELD

The present invention relates to an optical sorter.

BACKGROUND

Conventionally, there has been known an optical sorter in which a red light source configured to emit red light is disposed on one side with respect to a transit route of a sorting target and optical sensors are disposed on both the one side and the other side with respect to the transit route (for example, the following patent literature, PTL 1). According to this type of optical sorter, the optical sensor on the one side detects red light reflected by the sorting target and the optical sensor on the other side detects red light transmitted through the sorting target. The optical sorter discussed in PTL 1 determines whether a rice grain set as the sorting target is a milky grain based on a result of the detection of the red reflected light and transmitted light.

CITATION LIST

[PTL 1] Japanese Patent Application Public Disclosure No. 2010-42326

SUMMARY

Technical Problem

However, the conventional optical sorter leaves room for the improvement of distinguishing accuracy. For example, according to the optical sorter discussed in PTL 1, a milky grain can be determined based on a red reflected image (an image expressed by the reflected red light) and a red transmitted image (an image expressed by the transmitted red light), but a red reflected image (an image expressed by light acquired by combining the reflected red light and the transmitted red light) cannot be acquired and this imposes a limitation on types of distinguishable defective products. Therefore, it is required to enhance the accuracy of distinguishing a defective product and/or a foreign object by increasing the types of acquirable images. This requirement is not limited to red light, and is applied in common when light having an arbitrary wavelength is used. Further, this requirement is not limited to when a rice grain is sorted, and is applied in common when an arbitrary granular object is sorted.

Solution to Problem

The present invention has been made with the aim of solving the above-described problem, and can be realized as, for example, the following aspects.

According to a first aspect of the present invention, an optical sorter is provided. This optical sorter includes a first light source configured to emit first light toward a plurality of sorting targets in transit and disposed on a first side with respect to a transit route of the plurality of sorting targets, a second light source configured to emit second light having the same wavelength as the first light toward the plurality of sorting targets in transit and disposed on a second side opposite from the first side, an optical sensor disposed on at least one of the first side and the second side and configured to detect light associated with one sorting target among the plurality of sorting targets in transit during a plurality of scan periods including a first scan period and a second scan period, a determination part configured to determine a foreign object and/or a defective product with respect to the one sorting target based on a signal acquired by the optical sensor, and a light source control part configured to control the first light source and the second light source. The light source control part is configured to control the first light source and the second light source during the first scan period so as to turn on the first light source and/or the second light source in a first lighting pattern, which is a lighting pattern arbitrarily selected from a lighting pattern in which the first light source and the second light source are at least partially on, a lighting pattern in which only one of the first light source and the second light source is at least partially on, and a lighting pattern in which only the other of the first light source and the second light source is at least partially on, and is also configured to control the first light source and the second light source during the second scan period so as to turn on the first light source and/or the second light source in a second lighting pattern, which is a lighting pattern selected arbitrarily except for the first lighting pattern from the lighting pattern in which the first light source and the second light source are at least partially on, the lighting pattern in which only the one of the first light source and the second light source is at least partially on, and the lighting pattern in which only the other of the first light source and the second light source is at least partially on.

According to the optical sorter configured in this manner, the types of acquirable images can be increased depending on the selection of the first lighting pattern and the second lighting pattern, and the accuracy of distinguishing the defective product and/or the foreign object can be enhanced as a result thereof. The above-described "plurality of scan periods including the first scan period and the second scan period" is intended to include both when the "plurality of scan periods" is formed only by the "first scan period" and the "second scan period", and when the "plurality of scan periods" is formed by the "first scan period", the "second scan period", and another arbitrary scan period. In other words, the "plurality of scan periods including the first scan period and the second scan period" is not intended to exclude when another scan period is set in addition to the first scan period and the second scan period.

According to a second aspect of the present invention, in the first aspect, the first light and the second light are red light. The optical sensor includes a first optical sensor disposed on the first side and a second optical sensor disposed on the second side. The first light source and the second light source are at least partially on in the first lighting pattern, and only the first light source out of the first light source and the second light source is at least partially on in the second lighting pattern.

According to this aspect, during the first scan period, the first optical sensor on the first side detects reflected light (light reflected by the sorting target) based on the red light emitted from the first light source on the first side and transmitted light (light transmitted through the sorting target) based on the red light emitted from the second light source on the second side, and the second optical sensor on the second side detects transmitted light based on the red light emitted from the first light source on the first side and reflected light based on the red light emitted from the second light source on the second side. Further, during the second scan period, the first optical sensor on the first side detects only the reflected light based on the red light emitted from the first light source on the first side and the second optical sensor on the second side detects only the transmitted light based on the red light emitted from the first light source on the first side. In other words, the determination part can determine the foreign object and/or the defective product using a reflected image (an image expressed by the reflected light), a transmitted image (an image expressed by the transmitted light), and a reflected and transmitted image (an image expressed by light acquired by combining the reflected light and the transmitted light) with respect to the red light. Therefore, the number of types of distinguishable defective products increases compared to the conventional optical sorter using only the reflected image and the transmitted image with respect to the red light. For example, in a case where the sorting target is a rice grain, the optical sorter can distinguish a green immature grain using the reflected and transmitted image with respect to the red light.

According to a third aspect of the present invention, in the second aspect, the light source control part is configured to control the first light source and the second light source in such a manner that a lighting period and a non-lighting period of each of the first light source and the second light source are provided in the first scan period, and the lighting period and the non-lighting period of the first light source are provided in the second scan period. According to this aspect, the optical sorter can reduce the power consumption amount compared to when the first light source and the second light source are continuously on throughout the entire first scan period and compared to when the first light source is continuously on throughout the entire second scan period. Further, the optical sorter allows the temperatures of the first light source and the second light source to less increase with the aid of the reduction in the lighting duration, thereby being able to prevent or reduce a change in the characteristics of the first light source and the second light source accompanying the temperature increase (more specifically, a change in the wavelength region of the emitted light). Therefore, the optical sorter can further stably determine the foreign object and/or the defective product.

According to a fourth aspect of the present invention, in the third aspect, the light source control part is configured to control the first light source and the second light source in such a manner that the lighting period of each of the first light source and the second light source is started at a timing delayed behind a start of the first scan period in the first scan period and the lighting period of the first light source is started at a timing delayed behind a start of the second scan period in the second scan period. According to this aspect, the first light source and the second light source is off at the timing of the start of the first scan period. Further, the first light source is off at the timing of the start of the second scan period. Therefore, the light emitted from the first light source and/or the second light source during an N-th scan period (N is an integer equal to or greater than 2) is not detected during an N−1-th scan period. For example, if the first light source and the second light source are switched from an off-state to an on-state at the same time as the start of the N-th scan period (hypothetically suppose that this corresponds to the first scan period) (i.e., an end of the N−1-th scan period), the light emitted from the first light source and the second light source at the same time as the start of the N-th scan period might be mixed in a result of the detection during the N−1-th scan period as noise. On the other hand, according to the present aspect, such a phenomenon can be prevented and therefore the accuracy of the determination by the determination part can be improved.

The above-described various aspects may be realized in combination with the aspect of another known optical sorter. For example, the optical sorter may include at least one light source that emits light other than the red light (for example, green light and/or blue light) on the first side and/or the second side in any of the second to fourth aspects. In this case, the first optical sensor and the second optical sensor may detect the green light and/or the blue light in addition to the red light.

According to a fifth aspect of the present invention, in the first aspect, the optical sensor is configured to detect two types of light out of reflected light, which is light reflected by the sorting target, transmitted light, which is light transmitted through the sorting target, and reflected and transmitted light, which is light acquired by combining the reflected light and the transmitted light, based on the first lighting pattern and the second lighting pattern. The determination part is configured to determine the foreign object and/or the defective product based on two types of images corresponding to the two types of light detected by the optical sensor out of a reflected image, which is an image expressed by the reflected light, a transmitted image, which is an image expressed by the transmitted light, and a reflected and transmitted image, which is an image expressed by the reflected and transmitted light, and remaining one type of image acquired by a calculation carried out on a result of the detection of the two types of light.

According to this aspect, the optical sensor can acquire the two types of images out of the reflected image, the transmitted image, and the reflected and transmitted image directly by the optical sensor, and can also acquire the remaining one type of image by the calculation. Therefore, the determination part can accurately determine the foreign object and/or the defective product based on the three types of images (i.e., the reflected image, the transmitted image, and the reflected and transmitted image). For example, the number of types of usable images increases, and therefore the number of kinds of foreign objects and/or defective products increases. In addition, since the remaining one type of image is acquired by the calculation (i.e., is not acquired by setting a scan period for acquiring the remaining one type of image in addition to the first scan period and the second scan period), the resolutions of the two types of images do not reduce to acquire the remaining one type of image. Therefore, the distinguishing accuracy based on the two types of images does not reduce due to the acquisition of the remaining one type of image.

According to a sixth aspect of the present invention, in the fifth aspect, the first light source and the second light source are at least partially on in the first lighting pattern. Only the first light source out of the first light source and the second light source is at least partially on in the second lighting pattern. The optical sensor includes a first optical sensor disposed on the first side. The first optical sensor is configured to detect the reflected and transmitted light based on the first lighting pattern during the first scan period and detect the reflected light based on the second lighting pattern during the second scan period. The determination part is configured to determine the foreign object and/or the defective product based on at least the reflected and transmitted image and the reflected image corresponding to the reflected and transmitted light and the reflected light detected by the first optical sensor, and the transmitted image acquired by subtracting a result of the detection of the reflected light from a result of the detection of the reflected and transmitted light. According to this aspect, the determination part can use the transmitted image acquired by the calculation in addition to the reflected and transmitted image and the reflected image directly acquired by the first optical sensor, and therefore the distinguishing accuracy is improved.

According to a seventh aspect of the present invention, in the fifth or sixth aspect, the first light source and the second light source are at least partially on in the first lighting pattern. Only the first light source out of the first light source and the second light source is at least partially on in the second lighting pattern. The optical sensor includes a second optical sensor disposed on the second side. The second optical sensor is configured to detect the reflected and transmitted light based on the first lighting pattern during the first scan period and detect the transmitted light based on the second lighting pattern during the second scan period. The determination part is configured to determine the foreign object and/or the defective product based on at least the reflected and transmitted image and the transmitted image corresponding to the reflected and transmitted light and the transmitted light detected by the second optical sensor, and the reflected image acquired by subtracting a result of the detection of the transmitted light from a result of the detection of the reflected and transmitted light. According to this aspect, the determination part can use the reflected image acquired by the calculation in addition to the reflected and transmitted image and the transmitted image directly acquired by the second optical sensor, and therefore the distinguishing accuracy is improved. Especially, in an aspect constructed by combining the sixth aspect and the seventh aspect, the determination part can use the reflected and transmitted image, the transmitted image, and the reflected image acquired on the first side, and the reflected and transmitted image, the transmitted image, and the reflected image acquired on the second side. The characteristic of the foreign object and/or the defective product may appear only on one of the image acquired on the first side and the image acquired on the second side depending on the direction in which the sorting target faces when being irradiated with the first light and the second light, but this combined aspect can use the three types of images acquired on each of the both sides and therefore can achieve especially excellent distinguishing accuracy.

According to an eighth aspect of the present invention, in the fifth aspect, only the first light source out of the first light source and the second light source is at least partially on in the first lighting pattern. Only the second light source out of the first light source and the second light source is at least partially on in the second lighting pattern. The optical sensor includes a first optical sensor disposed on the first side. The first optical sensor is configured to detect the reflected light based on the first lighting pattern during the first scan period and detect the transmitted light based on the second lighting pattern during the second scan period. The determination part is configured to determine the foreign object and/or the defective product based on at least the reflected image and the transmitted image corresponding to the reflected light and the transmitted light detected by the first optical sensor, and the reflected and transmitted image acquired by adding a result of the detection of the reflected light and a result of the detection of the transmitted light. According to this aspect, the determination part can use the reflected and transmitted image acquired by the calculation in addition to the reflected image and the transmitted image directly acquired by the first optical sensor, and therefore the distinguishing accuracy is improved.

According to a ninth aspect of the present invention, in the eighth aspect, the optical sensor includes a second optical sensor disposed on the second side. The second optical sensor is configured to detect the transmitted light based on the first lighting pattern during the first scan period and detect the reflected light based on the second lighting pattern during the second scan period. The determination part is configured to determine the foreign object and/or the defective product based on at least the transmitted image and the reflected image corresponding to the transmitted light and the reflected light detected by the second optical sensor, and the reflected and transmitted image acquired by adding a result of the detection of the transmitted light and a result of the detection of the reflected light. According to this aspect, the determination part can use the reflected and transmitted image acquired by the calculation in addition to the transmitted image and the reflected image directly acquired by the second optical sensor, and therefore the distinguishing accuracy is improved. In addition, the determination part can use the reflected and transmitted image, the transmitted image, and the reflected image acquired on the first side, and the reflected and transmitted image, the transmitted image, and the reflected image acquired on the second side. Therefore, the optical sorter can achieve especially excellent distinguishing accuracy similarly to the aspect constructed by combining the sixth aspect and the seventh aspect.

According to a tenth aspect of the present invention, in any of the fifth to ninth aspects, the first light and the second light are red light. According to this aspect, the determination part can determine various kinds of foreign objects and/or defective products. For example, in the case where the sorting target is a rice grain, the optical sorter can determine a milky grain based on the reflected image and the transmitted image and also determine a green immature grain based on the reflected and transmitted image.

The above-described various aspects may be realized in combination with the aspect of another known optical sorter. For example, the optical sorter may include an additional light source other than the first light source and the second light source (for example, a light source that emits light having a wavelength different from the first light and the second light). In this case, the optical sorter may include an additional optical sensor for detecting the light emitted from the additional light source, or the optical sensor according to any of the first to tenth aspects may also detect the light emitted from the additional light source.

BRIEF DESCRIPTION OF THE DRAWINGS

FIG. 4 is a timing chart illustrating the relationship between scan periods of the optical sensors and timings of turning on the light sources according to a second embodiment.

FIG. 5 is a timing chart illustrating the relationship between scan periods of the optical sensors and timings of turning on the light sources according to a third embodiment.

FIG. 6 is a graph illustrating a spectral reflectance distribution with respect to brown rice.

FIG. 7 is a graph illustrating a spectral reflectance distribution with respect to a coffee bean.

FIG. 8 is a timing chart illustrating the relationship between scan periods of the optical sensors and timings of turning on the light sources according to a fourth embodiment.

FIG. 9 is a timing chart illustrating the relationship between scan periods of the optical sensors and timings of turning on the light sources according to a fifth embodiment.

DESCRIPTION OF EMBODIMENTS

A. First Embodiment

Figure 1:
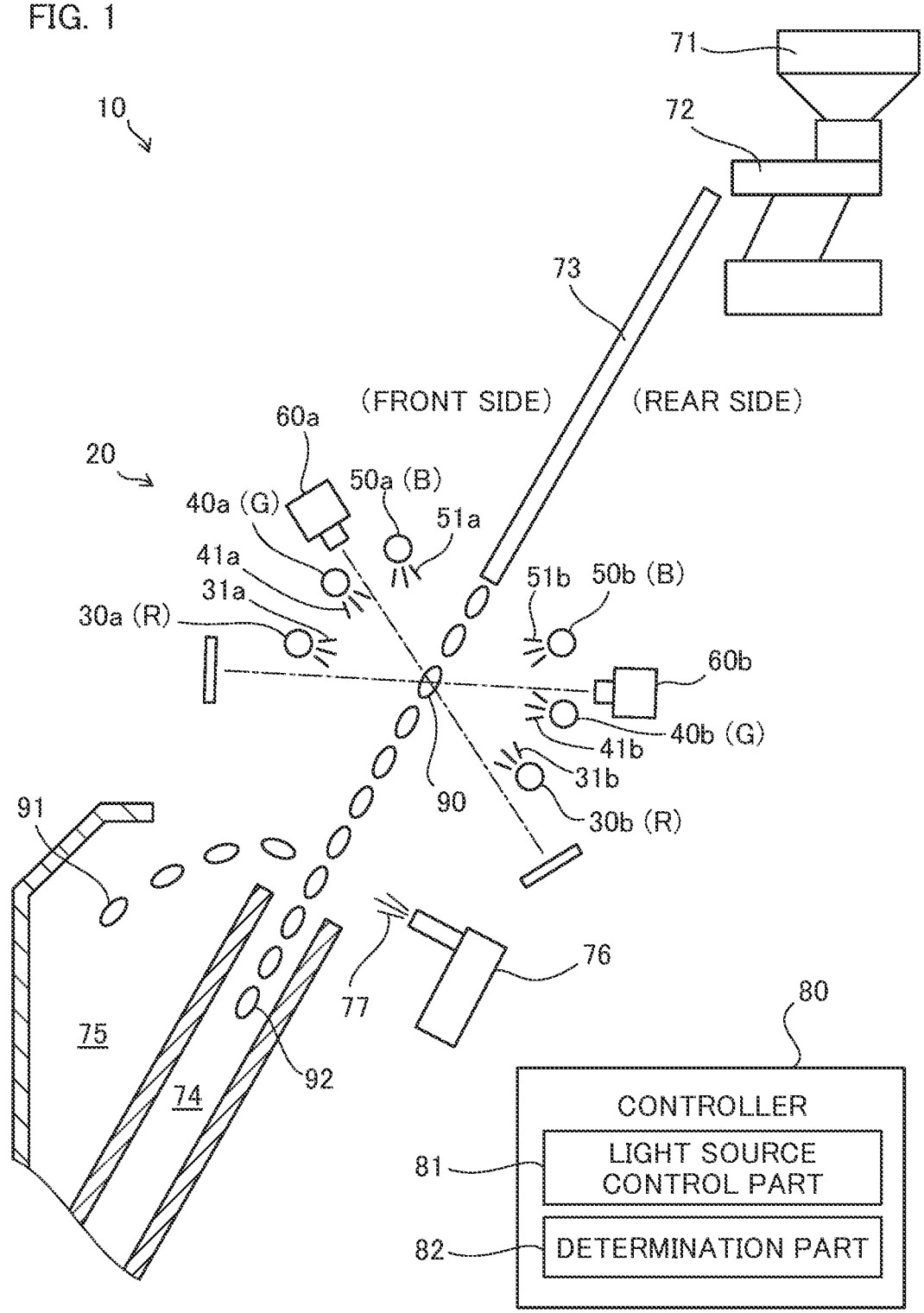
FIG. 1 is a schematic view illustrating an outline of the configuration of an optical sorter according to a first embodiment of the present invention.

FIG. 1 is a schematic view illustrating an outline of the configuration of an optical sorter (hereinafter simply referred to as a sorter) 10 according to a first embodiment of the present invention. In the present embodiment, the sorter 10 is used to sort a foreign object (for example, a small stone, mud, and a glass piece) and a defective product (for example, an immature grain and a colored grain) from a rice grain (more specifically, brown rice or milled rice) set as a sorting target (hereinafter simply referred to as a target) 90. However, the target 90 is not limited to brown rice or milled rice, and may be an arbitrary granular object. For example, the target 90 may be unhulled rice, a wheat grain, beans (a soybean, a chickpea, a green soybean, and the like), resin (a pellet and the like), a rubber piece, or the like.

As illustrated in FIG. 1, the sorter 10 includes an optical detection unit 20, a storage tank 71, a feeder 72, a chute 73, an acceptable product discharge gutter 74, a defective product discharge gutter 75, an ejector 76, and a controller 80. The controller 80 controls the overall operation of the sorter 10. The controller 80 also functions as a light source control part 81 and a determination part 82. The functions of the controller 80 may be realized by a CPU executing a predetermined program or may be realized by a dedicated circuit. The light source control part 81 and the determination part 82 may be realized by a single integrated device. For example, the light source control part 81 and the determination part 82 may be two functions realized by a single CPU. Alternatively, the light source control part 81 and the determination part 82 may be realized as individual different devices from each other. The details of the functions of the controller 80 will be described below.

The storage tank 71 temporarily stores the target 90 therein. The feeder 72 feeds the target 90 stored in the storage tank 71 onto the chute 73. The optical detection unit 20 irradiates the target 90 sliding down from the chute 73 with light, and detects light associated with the target 90 (more specifically, transmitted light transmitted through the target 90 and/or reflected light reflected by the target 90). An output from the optical detection unit 20, i.e., an analog signal indicating a detected light intensity is converted into a digital signal by an AC/DC converter (not illustrated). This digital signal (i.e., a tone value corresponding to the analog signal) is input to the controller 80. The controller 80 determines whether the target 90 is an acceptable product (i.e., a relatively high-quality rice grain), or a foreign object (i.e., something that is not a rice grain) or a defective product (i.e., a relatively low-quality rice grain) as the processing by the determination part 82 based on the input light detection result (i.e., an image). This determination is made with respect to each target 90.

If the target 90 is determined to be a foreign object or a defective product, the ejector 76 ejects air 77 toward this target 90. As a result, the target 90 is blown off, deviated from a falling trajectory from the chute 73, and guided to the defective product discharge gutter 75. On the other hand, if the target 90 is determined to be an acceptable object, the air 77 is not ejected. Therefore, the target 90 determined to be an acceptable product is guided to the acceptable product discharge gutter 74 without changing the falling trajectory thereof.

In the following description, the details of the optical detection unit 20 and the controller 80 will be described. As illustrated in FIG. 1, the optical detection unit 20 includes red light sources 30a and 30b, green light sources 40a and 40b, blue light sources 50a and 50b, and optical sensors 60a and 60b.

The red light source 30a emits red light 31a toward a plurality of targets 90 in transit (i.e., being falling from the chute 73). Similarly, the red light source 30b emits red light 31b (i.e., light having the same wavelength as the red light 31a) toward the plurality of targets 90 in transit. The green light source 40a emits green light 41a toward the plurality of targets 90 in transit. Similarly, the green light source 40b emits green light 41b toward the plurality of targets 90 in transit. The blue light source 50a emits blue light 51a toward the plurality of targets 90 in transit. The blue light source 50b emits blue light 51b toward the plurality of targets 90 in transit.

In the present embodiment, the red light sources 30a and 30b, the green light sources 40a and 40b, and the blue light sources 50 and 50b are LEDs. FIG. 1 illustrates these light sources assuming that the number of light sources is one for each of them, but the number of light sources may be plural for each with respect to at least a part of these light sources.

The optical sensors 60a and 60b detect light associated with one target 90 among the plurality of targets 90 in transit. The optical sensors 60a and 60b are color CCD sensors in the present embodiment, and can detect red light, green light, and blue light individually separately. However, the optical sensors 60a and 60b may be another type of color sensors such as color CMOS sensors. Further, the optical sensors 60a and 60b are line sensors in the present embodiment, but may be area sensors.

The red light source 30a, the green light source 40a, the blue light source 50a, and the optical sensor 60a are disposed on one side (also referred to as a front side) with respect to a transit route of the target 90 (i.e., the falling trajectory from the chute 73). On the other hand, the red light source 30b, the green light source 40b, the blue light source 50b, and the optical sensor 60b are disposed on the other side (also referred to as a rear side) with respect to the transit route of the target 90.

The optical sensor 60a on the front side can detect the red light 31a emitted from the red light source 30a on the front side and reflected by the target 90 (also referred to as the reflected red light 31a), the green light 41a emitted from the green light source 40a on the front side and reflected by the target 90 (also referred to as the reflected green light 41a), the blue light 51a emitted from the blue light source 50a on the front side and reflected by the target 90 (also referred to as the reflected blue light 51a), the red light 31b emitted from the red light source 30b on the rear side and transmitted through the target 90 (also referred to as the transmitted red light 31b), the green light 41b emitted from the green light source 40b on the rear side and transmitted through the target 90 (also referred to as the transmitted green light 41b), and the blue light 51b emitted from the blue light source 50b on the rear side and transmitted through the target 90 (also referred to as the transmitted blue light 51*b*).

The optical sensor 60*b* on the rear side can detect the red light 31*b* emitted from the red light source 30*b* on the rear side and reflected by the target 90 (also referred to as the reflected red light 31*b*), the green light 41*b* emitted from the green light source 40*b* on the rear side and reflected by the target 90 (also referred to as the reflected green light 41*b*), the blue light 51*b* emitted from the blue light source 50*b* on the rear side and reflected by the target 90 (also referred to as the reflected blue light 51*b*), the red light 31*a* emitted from the red light source 30*a* on the front side and transmitted through the target 90 (also referred to as the transmitted red light 31*a*), the green light 41*a* emitted from the green light source 40*a* on the front side and transmitted through the target 90 (also referred to as the transmitted green light 41*a*), and the blue light 51*a* emitted from the blue light source 50*a* on the front side and transmitted through the target 90 (also referred to as the transmitted blue light 51*a*).

As widely known, the optical sensors 60*a* and 60*b* scan one target 90 a plurality of times. In other words, the optical sensors 60*a* and 60*b* detect the light associated with the one target 90 during each of a plurality of scan periods. The scan period refers to a duration from a start to an end of one scan. The entire image of this one target 90 is acquired by combining images acquired from the respective scans. The "scan period" can be defined to mean a duration since a light receiving element starts accumulation of charges until the light receiving element ends the accumulation of charges in the case where the optical sensor is a CCD sensor. The "scan period" can be defined to mean a duration since a light receiving element starts accumulation of charges until the light receiving element outputs the accumulated charges in the case where the optical sensor is a CMOS sensor.

Figure 2:
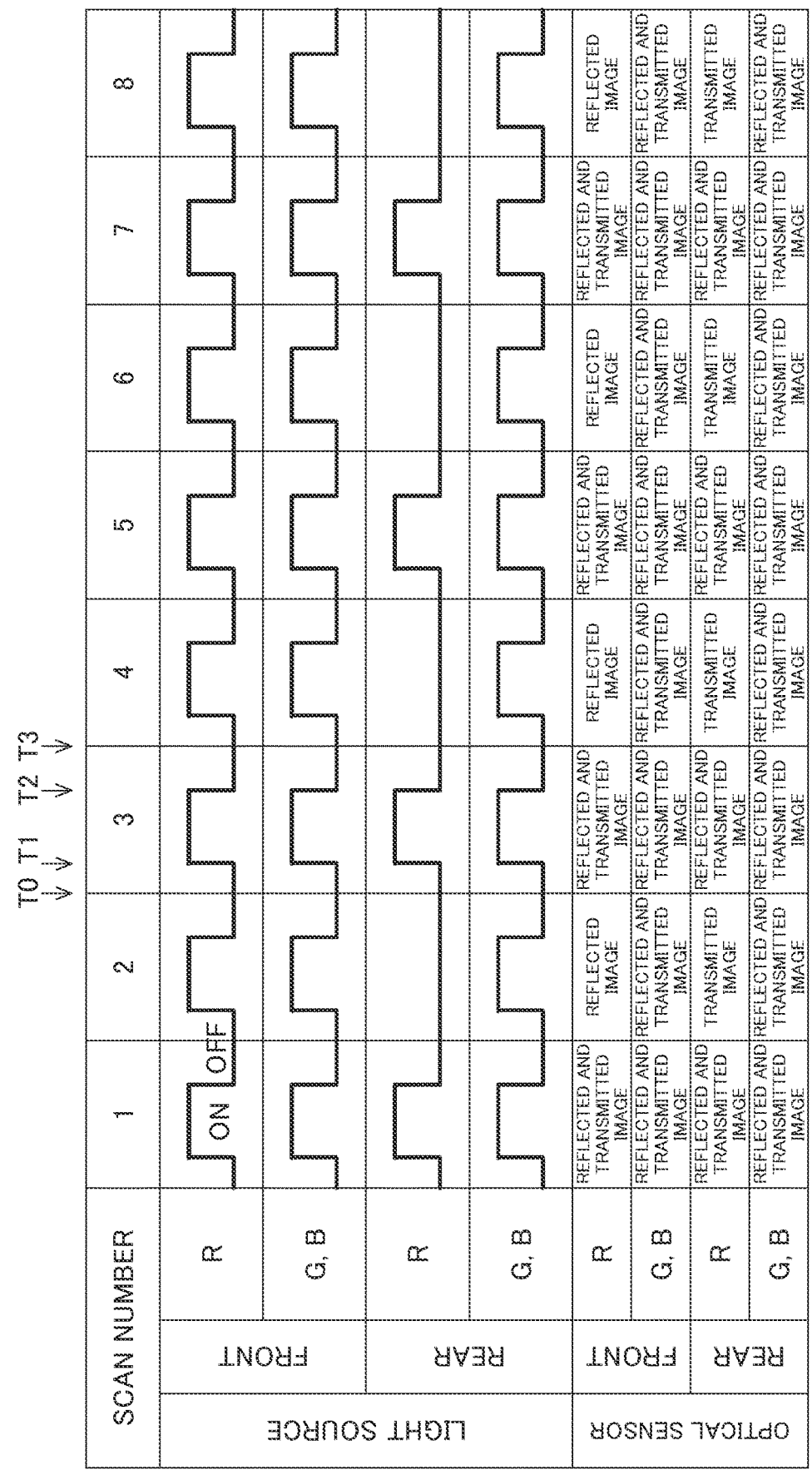
FIG. 2 is a timing chart illustrating the relationship between scan periods of optical sensors and timings of turning on light sources.

The optical detection unit 20 configured in this manner is controlled by the controller 80. The light source control part 81 controls the red light sources 30*a* and 30*b*, the green light sources 40*a* and 40*b*, and the blue light sources 50*a* and 50*b* according to a predetermined rule. FIG. 2 is a timing chart illustrating the relationship between the scan periods of the optical sensors 60*a* and 60*b* and timings of turning on these light sources. In FIG. 2, "R", "G", and "B" represent red, green, and blue, respectively.

Figure 3:
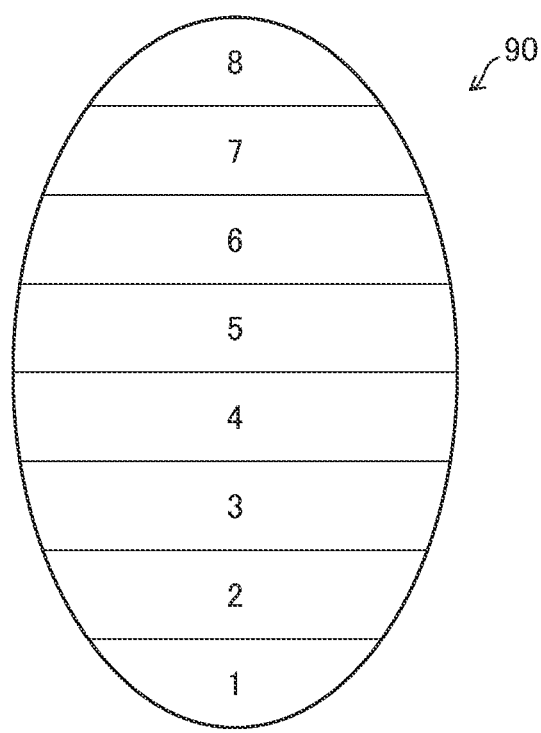
FIG. 3 illustrates the relationship between one sorting target and scan numbers.

FIG. 3 illustrates the relationship between the one target 90 and scan numbers of the optical sensors 60*a* and 60*b* (numbers each indicating what number scan this scan is). As illustrated in FIG. 3, in the present embodiment, the image data is acquired by scanning the one target 90 eight times (citing an example supposing that the target 90 is scanned a smaller number of times than the actual number of times for simplification of the description). The numbers 1 to 8 illustrated in FIG. 3 each indicate the number of a scan by which the image data of the corresponding region is acquired. For example, a region labeled "1" indicates that the image data is acquired by the first scan. In FIG. 2, "SCAN NUMBER" corresponds to the scan number illustrated in FIG. 3.

As illustrated in FIG. 2, the red light source 30*a* on the front side is on for a predetermined time during each of all the scan periods (indicated with ON in FIG. 2). On the other hand, the red light source 30*b* on the rear side is on for a predetermined time only during scan periods having odd scan numbers, and is off entirely during scan periods having even scan numbers. In this manner, the red light sources 30*a* and 30*b* are turned on so as to provide a scan period during which both of them are turned on and a scan period during which only one of them (only the front side in the present embodiment) is turned on.

The green light source 40*a* and the blue light source 50*a* on the front side are on for a predetermined time during each of all the scan periods. Similarly, the green light source 40*b* and the blue light source 50*b* on the rear side are on for a predetermined time during each of all the scan periods.

According to such a lighting manner, the optical sensor 60*a* on the front side detects light acquired by combining the reflected red light 31*a* and the transmitted red light 31*b*, light acquired by combining the reflected green light 41*a* and the transmitted green light 41*b*, and light acquired by combining the reflected blue light 51*a* and the transmitted blue light 51*b* individually separately during the scan periods having the odd scan numbers. In other words, a red reflected and transmitted image, a green reflected and transmitted image, and a blue reflected and transmitted image can be acquired via the optical sensor 60*a*. As used herein, the reflected image refers to an image expressed only by reflected light. The transmitted image refers to an image expressed only by transmitted light. The reflected and transmitted image refers to an image expressed by light acquired by combining reflected light and transmitted light.

Further, the optical sensor 60*a* on the front side detects the reflected red light 31*a*, light acquired by combining the reflected green light 41*a* and the transmitted green light 41*b*, and light acquired by combining the reflected blue light 51*a* and the transmitted blue light 51*b* individually separately during the scan periods having the even scan numbers. In other words, a red reflected image, a green reflected and transmitted image, and a blue reflected and transmitted image can be acquired via the optical sensor 60*a*.

On the other hand, the optical sensor 60*b* on the rear side detects light acquired by combining the transmitted red light 31*a* and the reflected red light 31*b*, light acquired by combining the transmitted green light 41*a* and the reflected green light 41*b*, and light acquired by combining the transmitted blue light 51*a* and the reflected blue light 51*b* individually separately during the scan periods having the odd scan numbers. In other words, a red reflected and transmitted image, a green reflected and transmitted image, and a blue reflected and transmitted image can be acquired via the optical sensor 60*b*.

Further, the optical sensor 60*b* on the rear side detects the transmitted red light 31*a*, light acquired by combining the transmitted green light 41*a* and the reflected green light 41*b*, and light acquired by combining the transmitted blue light 51*a* and the reflected blue light 51*b* individually separately during the scan periods having the even scan numbers. In other words, a red transmitted image, a green reflected and transmitted image, and a blue reflected and transmitted image can be acquired via the optical sensor 60*b*.

In sum, four types of images, namely, the reflected and transmitted image (formed by the regions numbered with the odd scan numbers in FIG. 3) and the reflected image (formed by the regions numbered with the even scan numbers in FIG. 3) on the front side, and the reflected and transmitted image (formed by the regions numbered with the odd scan numbers in FIG. 3) and the transmitted image (formed by the regions numbered with the even scan numbers in FIG. 3) on the rear side can be acquired as red images. Further, the reflected and transmitted image on the front side and the reflected and transmitted image on the rear side can be acquired as the green images. Further, the reflected and transmitted image on the front side and the reflected and transmitted image on the rear side can be acquired as the blue images. Each of the green images and the blue images is formed by the regions numbered with the scan numbers of 1 to 8 in FIG. 3.

The determination part 82 determines a foreign object and/or a defective product using the red reflected image, transmitted image, and reflected and transmitted images, the green reflected and transmitted images, and the blue reflected and transmitted images acquired in this manner. For example, whether the target 90 is a green immature grain is determined based on the front-side red reflected and transmitted image formed by the regions numbered with the odd scan numbers in FIG. 3 (i.e., the red reflected and transmitted image acquired via the optical sensor 60*a*) and the rear-side red reflected and transmitted image formed by the regions numbered with the odd scan numbers in FIG. 3 (i.e., the red reflected and transmitted image acquired via the optical sensor 60*b*).

Further, whether the target 90 is a milky grain is determined based on the rear-side red transmitted image formed by the regions numbered with the even scan numbers in FIG. 3. The front-side red reflected image formed by the regions numbered with the even scan numbers is not used in the present embodiment, but both the rear-side red transmitted image and the front-side red reflected image may be used to distinguish a milky grain.

Further, whether the target 90 is a colored grain is determined based on the front-side green reflected and transmitted image formed by the regions numbered with the scan numbers of 1 to 8, the front-side blue reflected and transmitted image formed by the regions numbered with the scan numbers of 1 to 8, the rear-side blue reflected and transmitted image formed by the regions numbered with the scan numbers of 1 to 8, and the rear-side blue reflected and transmitted image formed by the regions numbered with the scan numbers of 1 to 8. Typically, these determinations are made by comparing the tone value of the image data and a predetermined threshold value. For example, when the target 90 is a green immature grain, the tone value of the red transmitted image reduces compared to when the target 90 is an acceptable product. With use of this characteristic, the target 90 can be determined to be a green immature grain when the tone value of the red transmitted image is equal to or smaller than a threshold value. However, a known arbitrary determination method can be employed as a method for the determination by the determination part 82. A foreign object may be determined instead of or in addition to the above-described determination about a defective product.

As illustrated in FIG. 2, when turning on any of the light sources (for example, when turning on the red light source 30*b* on the rear side during the scan periods having the odd scan numbers), the light source control part 81 controls this light source in such a manner that a lighting period during which this light source is on and a non-lighting period during which this light source is off are provided in this scan period. For example, in the example illustrated in FIG. 2, the red light source 30*a* on the front side has a non-lighting period from a start time T0 of the scan period to a time T1, a lighting period from the time T1 to a time T2, and a non-lighting period from the time T2 to an end time T3 of the scan period in the third scan period. According to such a lighting manner, the sorter 10 can reduce the power consumption amount compared to when the light source is on throughout the entire scan period. Further, the sorter 10 allows the temperature of the light source to less increase, thereby being able to prevent or reduce a change in the wavelength region of the light emitted from the light source accompanying the temperature increase.

Further, when turning on any of the light sources, the light source control part 81 controls this light source in such a manner that the lighting period is started at a timing delayed behind the start of this scan period. For example, in the example illustrated in FIG. 2, the red light source 30*a* on the front side is turned on in such a manner that the lighting period thereof is started at a timing (i.e., the time T1) delayed behind the start time T0 of the scan period in the third scan period. In other words, the red light source 30*a* is off at the start time T0 of the scan period. Therefore, the red light 31*a* emitted from the red light source 30*a* on the front side during the third scan period is not detected by the optical sensor 60*a* or the optical sensor 60*b* during a scan period immediately preceding thereto (i.e., the second scan period). More specifically, hypothetically supposing that the red light source 30*a* on the front side is turned on at the start time T0 in the third scan period (this is also the end time of the second scan time), the red light 31*a* emitted at the same time as the start of the third scan period might be mixed in the result of the detection by the optical sensor 60*a* or the optical sensor 60*b* in the second scan period as noise. On the other hand, according to the present embodiment, such a phenomenon can be prevented and therefore the accuracy of the determination by the determination part 82 can be improved. This effect has been described citing the red light source 30*a* on the front side as an example, but also applies to all the light sources in common without being limited to the red light source 30*a* on the front side.

According to the above-described sorter 10, a scan period during which both of the red light source 30*a* on the front side and the red light source 30*b* on the rear side are at least partially on, and a scan period during which only one of them is at least partially on are set. Therefore, the determination part 82 can distinguish a green immature grain based on the red reflected and transmitted image in addition to being able to distinguish a milky grain based on the red reflected image (or the reflected image and the transmitted image). Therefore, the sorter 10 can increase the types of defective products distinguishable based on the red light (a green immature grain in the above-described example) compared to the conventional optical sorter that distinguishes only a milky grain using the red light as discussed in PTL 1. As a result, the sorter 10 can enhance the distinguishing accuracy as a whole.

Further, the green light sources 40*a* and 40*b* are at least partially on during all the scan periods, and therefore the resolutions do not reduce with respect to the green reflected and transmitted images acquired via the optical sensors 60*a* and 60*b*. The same also applies to the blue reflected and transmitted images. On the other hand, the red reflected and transmitted images, the red transmitted image, and the red reflected image acquired via the optical sensors 60*a* and 60*b* are half in resolution compared to the green reflected and transmitted images and the blue reflected and transmitted images due to the above-described lighting manner of the red light sources 30*a* and 30*b*. However, generally, most of green immature grains distinguished based on the red reflected and transmitted image and most of milky grains distinguished based on the red transmitted image are discolored throughout the entire grains or over large parts of the grains. Therefore, the distinguishing accuracy does not reduce significantly due to the reductions in the resolutions by half.

The above-described embodiment can be modified in various manners. For example, in the case where the red light sources 30*a* and 30*b* are at least partially on during at least one scan period, the red light sources 30*a* and 30*b* may be continuously on from the start time T0 to the end time T3 of this at least one scan period. Further, the green light sources 40a and 40b and the blue light sources 50a and 50b may be continuously on throughout all the scan periods. Further, the sorter 10 may employ a lighting manner in which the red light source 30a on the front side and the red light source 30b on the rear side are at least partially on during the scan periods having the odd scan numbers and the red light source 30a is off and the red light source 30b is at least partially on during the scan periods having the even scan numbers, instead of the lighting manner of the red light sources 30a and 30b illustrated in FIG. 2. Alternatively, the sorter 10 may employ a lighting manner in which the red light source 30a is at least partially on and the red light source 30b is off during the scan periods having the odd scan numbers and the red light source 30a and the red light source 30b are at least partially on during the scan periods having the even scan numbers. Alternatively, the sorter 10 may employ a lighting manner in which the red light source 30a is off and the red light source 30b is at least partially on during the scan periods having the odd scan numbers and the red light source 30a and the red light source 30b are at least partially on during the scan periods having the even scan numbers.

B. Second Embodiment

A second embodiment of the present invention will be described now. The second embodiment is different from the first embodiment in terms of the lighting manner of each of the light sources, and is similar to the first embodiment except for that. In the following description, the second embodiment will be described focusing only on differences from the first embodiment. FIG. 4 is a timing chart illustrating the relationship between scan periods of the optical sensors 60a and 60b and a timing of turning on each of the light sources according to the second embodiment. In the example illustrated in FIG. 4, lighting patterns can be broadly divided into a pattern in scan periods having scan numbers of 3N−2 (N is a natural number), a pattern in scan periods having scan numbers of 3N−1, and a pattern in scan periods having scan numbers of 3N. In other words, three lighting patterns are repeated in the second embodiment.

The same lighting manner as the scan periods having the odd scan numbers according to the first embodiment is employed in the scan periods having the scan numbers of 3N−2. The same lighting manner as the scan periods having the even scan numbers according to the first embodiment is employed in the scan periods having the scan numbers of 3N−1. The red light source 30a on the front side is off and the red light source 30b on the rear side is at least partially on during the scan periods having the scan numbers of 3N. In other words, between the scan periods having the scan numbers of 3N−1 and the scan periods having the scan numbers of 3N, the red light source to be at least partially on is switched between the front side and the rear side. As a result, the red transmitted image can be acquired via the optical sensor 60a and the red reflected image can be acquired via the optical sensor 60b during the scan periods having the scan numbers of 3N. The scan numbers as far as 8 are illustrated in the example illustrated in FIG. 4 in conformity with the first embodiment, but the number of scan numbers may be set to a multiple of 3.

According to the second embodiment, the front-side red transmitted image, the front-side red reflected image, the rear-side red transmitted image, and the rear-side red reflected image can be acquired. This embodiment is effective when the accuracy of a determination based on the red transmitted image and/or the red reflected image is desired to be enhanced by using the images on both the front side and the rear side.

The above-described second embodiment can be modified in various manners. For example, assuming that A, B, and C represent the lighting pattern of each of the light sources during the scan period having the scan number 1, the lighting pattern of each of the light sources during the scan period having the scan number 2, and the lighting pattern of each of the light sources during the scan period having the scan number 3 in FIG. 4, respectively, FIG. 4 illustrates the example in which A, B, and C are repeated in this order, but the order in which each of the patterns occurs can be arbitrarily set out of six possible choices (more specifically, A, B, C; A, C, B; B, A, C; B, C, A; C, A, B; and C, B, A).

C. Third Embodiment

A third embodiment of the present invention will be described now. The third embodiment is different from the first embodiment and the second embodiment in terms of the lighting manner of each of the light sources, and is similar to the first embodiment and the second embodiment except for that. In the following description, the third embodiment will be described focusing only on differences from the first embodiment and the second embodiment. FIG. 5 is a timing chart illustrating the relationship between scan periods of the optical sensors 60a and 60b and a timing of turning on each of the light sources according to the third embodiment. In the example illustrated in FIG. 5, lighting patterns can be broadly divided into a pattern in scan periods having scan numbers of 4M−3 (M is a natural number), a pattern in scan periods having scan numbers of 4M−2, a pattern in scan periods having scan numbers of 4M−1, and a pattern in scan periods having scan numbers of 4M. In other words, four lighting patterns are repeated in the third embodiment.

The same lighting manner as the scan periods having the scan numbers of 3N−2 according to the second embodiment is employed in the scan periods having the scan numbers of 4M−3. The same lighting manner as the scan periods having the scan numbers of 3N−1 according to the second embodiment is employed in the scan periods having the scan numbers of 4M−2. The same lighting manner as the scan periods having the scan numbers of 4M−3 according to the third embodiment is employed in the scan periods having the scan numbers of 4M−1. The same lighting manner as the scan periods having the scan numbers of 3N according to the second embodiment is employed in the scan periods having the scan numbers of 4M. In other words, in the third embodiment, the types of acquired images are the same as the second embodiment, but the resolutions of the front-side red reflected and transmitted image and the rear-side red reflected and transmitted image are twice as high as the second embodiment. This embodiment is effective when the red reflected and transmitted image is also desired to secure a certain level of resolution therefor.

The above-described third embodiment can be modified in various manners. For example, each of the lighting patterns illustrated in FIG. 5 can be set in an arbitrary occurrence order, similarly to the above description about the modification of the second embodiment.

D. Fourth Embodiment

In the following description, a fourth embodiment of the present invention will be described focusing only on differences from the first embodiment. FIG. 8 is a timing chart illustrating the relationship between scan periods of the optical sensors 60a and 60b and a timing of turning on each of the light sources according to the fourth embodiment. As illustrated in FIG. 8, the lighting manner of each of the light sources is similar to the lighting manner according to the first embodiment illustrated in FIG. 2.

In the present embodiment, the determination part 82 determines a foreign object and/or a defective product using the green images on the front side and the rear side and the blue images on the front side and the rear side. For example, in the case where the target 90 is brown rice, whether the target 90 is, for example, a pecky rice due to stink bug, a discolored grain, a green immature grain, or a dead grain can be determined with use of these green images and blue images.

Further, the determination part 82 determines a foreign object and/or a defective product using a red image acquired by a calculation in addition to the above-described four types of red images directly acquired via the optical sensors 60a and 60b. More specifically, the tone value of the transmitted image is calculated by subtracting the tone value of the reflected image from the tone value of the reflected and transmitted image with respect to the red images on the front side. This calculation is carried out between corresponding pixels. Further, the reflected and transmitted images are acquired during the scan periods having the odd scan numbers and the transmitted images are acquired during the scan periods having the even scan numbers, and therefore this calculation (the subtraction in this example) is carried out between images acquired in two scan periods adjacent to each other. Therefore, the acquired image is handled as an image acquired in these two scan periods adjacent to each other. For example, a transmitted image of the region numbered with "1" and the region numbered with "2" in FIG. 3 is acquired by calculating the subtraction between the reflected and transmitted image acquired during the scan period having the scan number 1 and the reflected image acquired during the scan period having the scan number 2. Similarly, the tone value of the reflected image is also calculated by subtracting the tone value of the transmitted image from the tone value of the reflected and transmitted image with respect to the red images on the rear side. The determination part 82 determines a foreign object and/or a defective product using the transmitted image on the front side and the reflected image on the rear side acquired by the calculation in this manner, in addition to the above-described four types of red images directly acquired via the optical sensors 60a and 60b with respect to the red images. FIG. 8 illustrates, in the form of a list for each scan period, the images directly acquired via the optical sensors 60a and 60b and the images acquired by the calculation according to the above-described method.

For example, in the case where the target 90 is brown rice, whether the target 90 is a green immature grain can be determined with use of the reflected and transmitted images on the front side and the rear side. Further, whether the target 90 is a milky grain can be determined based on the reflected image and the transmitted image on the front side and the reflected image and the transmitted image on the rear side. Without being limited to the above-described examples, the determination about a foreign object and/or a defective product may be made by comprehensively evaluating the red image and an image in another color (the green image and/or the blue image).

According to the above-described sorter 10, the determination part 82 can determine a foreign object and/or a defective product using the images acquired by the calculation (the transmitted image on the front side and the reflected image on the rear side) in addition to the images directly acquired by the optical sensors 60a and 60b (the reflected and transmitted images on the front side and the rear side, the reflected image on the front side, and the transmitted image on the rear side) with respect to the red images. In other words, the determination part 82 can determine a foreign object and/or a defective product using three types of images (the reflected and transmitted image, the transmitted image, and the reflected image) on both the front side and the rear side. Therefore, the distinguishing accuracy can be enhanced compared to when the reflected and transmitted image and only one of the transmitted image and the reflected image are used. For example, supposing that the sorter 10 determines a milky grain, a transmitted image acquired from a milky grain has a relatively low tone value (a dark tone value) and therefore a milky grain can be determined with use of only the transmitted image. However, if a plurality of targets 90 overlapping each other is irradiated with the light, a transmitted image having a relatively low tone value is acquired even when the plurality of targets 90 is acceptable products, and this leads to a possibility of falsely determining that the target 90 is a milky grain although being actually an acceptable product. On the other hand, the reflected image acquired from a milky grain has a relatively high tone value (a bright tone value), and a transmitted image having a relatively low tone value is acquired when the plurality of targets 90 overlapping each other is irradiated with the light, and therefore using both the transmitted image and the reflected image (i.e., determining whether the target 90 satisfies both a threshold value condition set for the reflected image and a threshold value condition set for the transmitted image) allows a milky grain to be accurately determined.

In addition, since the transmitted image on the front side and the reflected image on the rear side are acquired by the calculation, i.e., are not acquired by additionally setting a scan period employing a lighting pattern in which the red light sources 30a and 30b are turned on in a pattern other than the lighting patterns illustrated in FIG. 8, the resolutions of the images directly acquired by the optical sensors 60a and 60b do not reduce due to the acquisition of the transmitted image on the front side and the reflected image on the rear side.

Further, in this type of optical sorter, the characteristic of a foreign object and/or a defective product may appear only on one of the image acquired on the front side and the image acquired on the rear side depending on the direction in which the target 90 faces when being irradiated with the light, but, according to the sorter 10, the reflected and transmitted images, the transmitted images, and the reflected images are acquired on both the front side and the rear side, and therefore high distinguishing accuracy can be acquired even in such a case.

The above-described embodiment can be modified in various manners. For example, the sorter 10 may employ a lighting pattern in which the red light source 30a on the front side and the red light source 30b on the rear side are at least partially on during the scan periods having the odd scan numbers and also employ a lighting pattern in which the red light source 30a is off and the red light source 30b is at least partially on during the scan periods having the even scan numbers, instead of the lighting patterns of the red light source 30a and the red light source 30b illustrated in FIG. 8. Alternatively, the sorter 10 may employ a lighting pattern in which the red light source 30a is at least partially on and the red light source 30b is off during the scan periods having the odd scan numbers and also employ a lighting pattern in which the red light source 30a and the red light source 30b are at least partially on during the scan periods having the even scan numbers. Alternatively, the sorter 10 may employ a lighting pattern in which the red light source 30a is off on and the red light source 30b is at least partially on during the scan periods having the odd scan numbers and also employ a lighting pattern in which the red light source 30a and the red light source 30b are at least partially on during the scan periods having the even scan numbers. In any of these cases, the reflected image or the transmitted image not directly acquired by the optical sensors 60a and 60b can be acquired by the calculation and used for the determination by the determination part 82.

E. Fifth Embodiment

A fifth embodiment of the present invention will be described now. The fifth embodiment is different from the fourth embodiment in terms of the lighting patterns of the red light sources 30a and 30b. Further, due to this difference, the reflected and transmitted image, the transmitted image, and the reflected image are acquired by a method different from the fourth embodiment. In the following description, the fifth embodiment will be described focusing only on differences from the fourth embodiment. FIG. 9 is a timing chart illustrating the relationship between scan periods of the optical sensors 60a and 60b and a timing of turning on each of the light sources according to the fifth embodiment.

As illustrated in FIG. 9, the red light source 30a on the front side is on for a predetermined time only during the scan periods having the odd scan numbers, and is off entirely during the scan periods having the even scan numbers. On the other hand, the red light source 30b on the rear side is on for a predetermined time only during the scan periods having the even scan numbers, and is off entirely during the scan periods having the odd scan numbers. In this manner, the red light sources 30a and 30b are turned on in such a manner that a scan period during which only one of the red light sources 30a and 30b is at least partially on and a scan period during which only the other of them is at least partially on are provided.

According to such a lighting manner, the reflected red light 31a is detected during the scan periods having the odd scan numbers and the transmitted red light 31b is detected during the scan periods having the even scan numbers by the optical sensor 60a on the front side with respect to the red light. In other words, the red reflected image and the red transmitted image can be acquired via the optical sensor 60a. Further, the transmitted red light 31a is detected during the scan periods having the odd scan numbers and the reflected red light 31b is detected during the scan periods having the even scan numbers by the optical sensor 60b on the rear side with respect to the red light. In other words, the red transmitted image and the red reflected image can be acquired via the optical sensor 60b.

Then, the tone value of the reflected and transmitted image is calculated by adding the tone value of the reflected image and the tone value of the transmitted image with respect to the red images on the front side. This calculation is carried out between corresponding pixels. Further, the reflected images are acquired during the scan periods having the odd scan numbers and the transmitted images are acquired during the scan periods having the even scan numbers, and therefore this calculation (the addition in this example) is carried out between images acquired in two scan periods adjacent to each other. Therefore, the acquired image is handled as an image acquired in these two scan periods adjacent to each other. For example, a reflected and transmitted image of the region numbered with "1" and the region numbered with "2" in FIG. 3 is acquired by calculating the addition between the reflected image acquired during the scan period having the scan number 1 and the transmitted image acquired during the scan period having the scan number 2. Similarly, the tone value of the reflected and transmitted image is also calculated by adding the tone value of the transmitted image and the tone value of the reflected image with respect to the red images on the rear side. FIG. 9 illustrates, in the form of a list for each scan period, the reflected images and the transmitted images directly acquired via the optical sensors 60a and 60b and the reflected and transmitted images acquired by the calculation according to the above-described method.

The determination part 82 determines a foreign object and/or a defective product using the reflected and transmitted images on the front side and the rear side acquired by the calculation in the above-described manner, in addition to the reflected image and the transmitted image on the front side and the transmitted image and the reflected image on the rear side directly acquired via the optical sensors 60a and 60b with respect to the red images.

According to this fifth configuration, the determination part 82 can also determine a foreign object and/or a defective product using three types of images (the reflected and transmitted image, the transmitted image, and the reflected image) on both the front side and the rear side, similarly to the fourth embodiment. Therefore, the fifth embodiment can achieve similar advantageous effects to the fourth embodiment.

The above-described fifth embodiment can be modified in various manners. For example, the sorter 10 may employ a lighting pattern in which the red light source 30a on the front side is off and the red light source 30b on the rear side is at least partially on during the scan periods having the odd scan numbers and also employ a lighting pattern in which the red light source 30a is at least partially on and the red light source 30b is off during the scan periods having the even scan numbers, instead of the lighting patterns of the red light source 30a and the red light source 30b illustrated in FIG. 9. Even in this case, the reflected and transmitted images not directly acquired by the optical sensors 60a and 60b can be acquired by the calculation and used for the determination by the determination part 82.

Having described several embodiments of the present invention, the above-described embodiments of the invention are intended to facilitate the understanding of the present invention, and are not intended to limit the present invention thereto. The present invention can be modified or improved without departing from the spirit thereof, and includes equivalents thereof. Further, each of the elements described in the claims and the specification can be arbitrarily combined or arbitrarily omitted within a range that allows it to remain capable of achieving at least a part of the above-described objects or bringing about at least a part of the above-described advantageous effects. For example, the lighting manners illustrated in FIGS. 2, 4, and 5 are merely examples, and the first to third embodiments can be modified so as to include a scan period employing another arbitrary lighting pattern as long as the scan period during which both of the red light source 30a on the front side and the red light source 30b on the rear side are at least partially on and the scan period during which only one of them is at least partially on are provided. Further, in modifications of the first to third embodiments, how frequently each of the plurality of lighting patterns occurs can be arbitrarily set according to the resolution required for each of the acquired images as long as the scan period during which both of the red light source 30a on the front side and the red light source 30b on the rear side are at least partially on and the scan period during which only one of them is at least partially on are provided. For example, in the first embodiment, the number of scan periods during which both of the red light source 30a on the front side and the red light source 30b on the rear side are at least partially on may be larger than the number of scan periods during which only one of them is at least partially on and vice versa. Further, a conveyor may be employed as the means for transporting the target 90 instead of the chute 73. Further, an arbitrary foreign object and/or defective product of an arbitrary granular object may be distinguished with use of the red reflected image and/or transmitted image and the red reflected and transmitted image. For example, in a case where the target 90 is a coffee bean, a yellowish grain as a defective product may be distinguished based on the red reflected image.

Further, the wavelengths of the red light beams 31a and 31b emitted from the red light sources 30a and 30b can be arbitrarily set based on the kind of the target 90 and the kind of a foreign object and/or a defective product that should be distinguished. For example, in the case where the target 90 is brown rice, a green immature grain can be accurately distinguished based on the acquired red reflected image by using light sources that emit the red light beams 31a and 31b having peak wavelengths of 645 nm or longer and 675 nm or shorter as the red light sources 30a and 30b in consideration of a spectral reflectance distribution with respect to brown rice illustrated in FIG. 6. Alternatively, in the case where the target 90 is a coffee bean, an extremely light yellow grain, a light yellow grain, and a dark yellow grain can be accurately distinguished based on the acquired red reflected image by using light sources that emit the red light beams 31a and 31b having peak wavelengths of 665 nm or longer and 695 nm or shorter as the red light sources 30a and 30b in consideration of a spectral reflectance distribution with respect to a coffee bean illustrated in FIG. 7

Further, the red light sources 30a and 30b are not limited to LEDs and can be arbitrary types of light sources. For example, the red light sources 30a and 30b may be CCFLs (cold-cathode fluorescent lamps). Even in this case, CCFLs having appropriate peak wavelengths (for example, 665 nm or longer and 695 nm or shorter in the case where the target 90 is a coffee bean) may be selected according to the kind of the target 90 and the kind of a foreign object and/or a defective product that should be distinguished.

Further, in the case where the red light sources 30a and 30b are at least partially on during at least one scan period in the lighting patterns illustrated in FIG. 8 or 9, the red light sources 30a and 30b may be continuously on from the start time T0 to the end time T3 (refer to FIG. 8) of this at least one scan period. Further, the green light source 40a, the green light source 40b, the blue light source 50a, and the blue light source 50b may be continuously on throughout all the scan periods.

Further, the lighting manners illustrated in FIGS. 8 and 9 are merely examples, and the fourth and fifth embodiments can be modified so as to additionally include a scan period employing another arbitrary lighting pattern not illustrated in FIG. 8 or 9. Further, how frequently each of the plurality of lighting patterns occurs can be arbitrarily set according to the resolution required for each of the acquired images. For example, in the fourth embodiment, the number of scan periods during which both of the red light source 30a on the front side and the red light source 30b on the rear side are at least partially on may be larger than the number of scan periods during which only one of them is at least partially on and vice versa.

Further, one of the optical sensors 60a and 60b may be omitted in the fourth and fifth embodiments. Further, a conveyor may be employed as the means for transporting the target 90 instead of the chute 73. Further, the above-described calculation (the subtraction or the addition) may be applied to an analog signal instead of the configuration in which the calculation is applied to the digital tone value. Further, the above-described calculation (the subtraction or the addition) may be applied to an image acquired based on light having an arbitrary wavelength (for example, this may be green light, may be blue light, or may be invisible light) instead of the red image for the determination part 82 to use it. Further, an arbitrary foreign object and/or defective product of an arbitrary granular object, without being limited to a rice grain, may be distinguished.

The red light source 30a can be construed as an example of a "first light source" in the present invention or can also be construed as an example of a "second light source" in the present invention. Similarly, the red light source 30b can be construed as an example of the "second light source" in the present invention or can also be construed as an example of the "first light source". Further, the optical sensor 60a can be construed as an example of a "first optical sensor" in the present invention or can also be construed as an example of a "second optical sensor" in the present invention. Similarly, the optical sensor 60b can be construed as an example of the "second optical sensor" in the present invention or can also be construed as an example of the "first optical sensor" in the present invention. Further, the scan periods having the odd scan numbers exemplified in FIG. 8 or 9 can be construed as an example of a "first scan period" in the present invention or can also be construed as an example of a "second scan period" in the present invention. Similarly, the scan periods having the even scan numbers exemplified in FIG. 8 or 9 can be construed as an example of the "second scan period" in the present invention or can also be construed as an example of the "first scan period" in the present invention.

DESCRIPTION OF NUMERALS 10 optical sorter
20 optical detection unit
30a, 30b red light source
31a, 31b red light (reflected red light and transmitted red light)
40a, 40b green light source
41a, 41b green light (reflected green light and transmitted green light)
50a, 50b blue light source
51a, 51b blue light (reflected blue light and transmitted blue light)
60a, 60b optical sensor
71 storage tank
72 feeder
73 chute
74 acceptable product discharge gutter
75 defective product discharge gutter
76 ejector
77 air
80 controller
81 light source control part
82 determination part
90 sorting target

The invention claimed is:

1. An optical sorter comprising:

a first light source configured to emit first light toward a plurality of sorting targets in transit and disposed on a first side with respect to a transit route of the plurality of sorting targets;

a second light source configured to emit second light having the same wavelength as the first light toward the plurality of sorting targets in transit and disposed on a second side opposite from the first side;

an optical sensor disposed on at least one of the first side and the second side and configured to detect light associated with one sorting target among the plurality of sorting targets in transit during a plurality of scan periods including a first scan period and a second scan period; and a processor, wherein the processor is configured to:

determine a foreign object and/or a defective product with respect to the one sorting target based on a signal acquired by the optical sensor; and control the first light source and the second light source, the processor is further configured to control the first light source and the second light source during the first scan period so as to turn on the first light source and/or the second light source in a first lighting pattern, which is a lighting pattern arbitrarily selected from a lighting pattern in which the first light source and the second light source are at least partially on, a lighting pattern in which only one of the first light source and the second light source is at least partially on, and a lighting pattern in which only the other of the first light source and the second light source is at least partially on, and is further configured to control the first light source and the second light source during the second scan period so as to turn on the first light source and/or the second light source in a second lighting pattern, which is a lighting pattern selected arbitrarily except for the first lighting pattern from the lighting pattern in which the first light source and the second light source are at least partially on, the lighting pattern in which only the one of the first light source and the second light source is at least partially on, and the lighting pattern in which only the other of the first light source and the second light source is at least partially on, the first light and the second light are red light, the optical sensor includes a first optical sensor disposed on the first side and a second optical sensor disposed on the second side, and the first light source and the second light source are at least partially on in the first lighting pattern, and only the first light source out of the first light source and the second light source is at least partially on in the second lighting pattern, and the processor is further configured to determine the foreign object and/or the defective product based on a reflected and transmitted image acquired during the first scan period by each of the first optical sensor and the second optical sensor, a reflected image acquired during the second scan period by the first optical sensor, and a transmitted image acquired during the second scan period by the second optical sensor.

2. An optical sorter comprising:

a first light source configured to emit first light toward a plurality of sorting targets in transit and disposed on a first side with respect to a transit route of the plurality of sorting targets;

a second light source configured to emit second light having the same wavelength as the first light toward the plurality of sorting targets in transit and disposed on a second side opposite from the first side;

an optical sensor disposed on at least one of the first side and the second side and configured to detect light associated with one sorting target among the plurality of sorting targets in transit during a plurality of scan periods including a first scan period and a second scan period; and a processor, wherein the processor is configured to:

determine a foreign object and/or a defective product with respect to the one sorting target based on a signal acquired by the optical sensor; and control the first light source and the second light source, the processor is further configured to control the first light source and the second light source during the first scan period so as to turn on the first light source and/or the second light source in a first lighting pattern, which is a lighting pattern arbitrarily selected from a lighting pattern in which the first light source and the second light source are at least partially on, a lighting pattern in which only one of the first light source and the second light source is at least partially on, and a lighting pattern in which only the other of the first light source and the second light source is at least partially on, and is further configured to control the first light source and the second light source during the second scan period so as to turn on the first light source and/or the second light source in a second lighting pattern, which is a lighting pattern selected arbitrarily except for the first lighting pattern from the lighting pattern in which the first light source and the second light source are at least partially on, the lighting pattern in which only the one of the first light source and the second light source is at least partially on, and the lighting pattern in which only the other of the first light source and the second light source is at least partially on, the first light and the second light are red light, the optical sensor includes a first optical sensor disposed on the first side and a second optical sensor disposed on the second side, the first light source and the second light source are at least partially on in the first lighting pattern, and only the first light source out of the first light source and the second light source is at least partially on in the second lighting pattern, and the processor is configured to control the first light source and the second light source in such a manner that a lighting period and a non-lighting period of each of the first light source and the second light source are provided in the first scan period, and the lighting period and the non-lighting period of the first light source are provided in the second scan period.

3. The optical sorter according to claim 2, wherein the processor is configured to control the first light source and the second light source in such a manner that the lighting period of each of the first light source and the second light source is started at a timing delayed behind a start of the first scan period in the first scan period and the lighting period of the first light source is started at a timing delayed behind a start of the second scan period in the second scan period.

4. An optical sorter comprising:

a first light source configured to emit first light toward a plurality of sorting targets in transit and disposed on a first side with respect to a transit route of the plurality of sorting targets;

a second light source configured to emit second light having the same wavelength as the first light toward the plurality of sorting targets in transit and disposed on a second side opposite from the first side;

an optical sensor disposed on at least one of the first side and the second side and configured to detect light associated with one sorting target among the plurality of sorting targets in transit during a plurality of scan periods including a first scan period and a second scan period; and a processor, wherein the processor is configured to:

determine a foreign object and/or a defective product with respect to the one sorting target based on a signal acquired by the optical sensor; and control the first light source and the second light source, the processor is further configured to control the first light source and the second light source during the first scan period so as to turn on the first light source and/or the second light source in a first lighting pattern, which is a lighting pattern arbitrarily selected from a lighting pattern in which the first light source and the second light source are at least partially on, a lighting pattern in which only one of the first light source and the second light source is at least partially on, and a lighting pattern in which only the other of the first light source and the second light source is at least partially on, and is further configured to control the first light source and the second light source during the second scan period so as to turn on the first light source and/or the second light source in a second lighting pattern, which is a lighting pattern selected arbitrarily except for the first lighting pattern from the lighting pattern in which the first light source and the second light source are at least partially on, the lighting pattern in which only the one of the first light source and the second light source is at least partially on, and the lighting pattern in which only the other of the first light source and the second light source is at least partially on, the optical sensor is configured to detect two types of light out of reflected light, which is light reflected by the sorting target, transmitted light, which is light transmitted through the sorting target, and reflected and transmitted light, which is light acquired by combining the reflected light and the transmitted light, based on the first lighting pattern and the second lighting pattern, and the processor is configured to determine the foreign object and/or the defective product based on two types of images corresponding to the two types of light detected by the optical sensor out of a reflected image, which is an image expressed by the reflected light, a transmitted image, which is an image expressed by the transmitted light, and a reflected and transmitted image, which is an image expressed by the reflected and transmitted light, and remaining one type of image acquired by a calculation carried out based on a result of the detection of the two types of light.

5. The optical sorter according to claim 4, wherein the first light source and the second light source are at least partially on in the first lighting pattern, only the first light source out of the first light source and the second light source is at least partially on in the second lighting pattern, the optical sensor includes a first optical sensor disposed on the first side, the first optical sensor is configured to detect the reflected and transmitted light based on the first lighting pattern during the first scan period and detect the reflected light based on the second lighting pattern during the second scan period, and the processor is configured to determine the foreign object and/or the defective product based on at least the reflected and transmitted image and the reflected image corresponding to the reflected and transmitted light and the reflected light detected by the first optical sensor, and the transmitted image acquired by subtracting a result of the detection of the reflected light from a result of the detection of the reflected and transmitted light.

6. The optical sorter according to claim 4, wherein the first light source and the second light source are at least partially on in the first lighting pattern, only the first light source out of the first light source and the second light source is at least partially on in the second lighting pattern, the optical sensor includes a second optical sensor disposed on the second side, the second optical sensor is configured to detect the reflected and transmitted light based on the first lighting pattern during the first scan period and detect the transmitted light based on the second lighting pattern during the second scan period, and the processor is configured to determine the foreign object and/or the defective product based on at least the reflected and transmitted image and the transmitted image corresponding to the reflected and transmitted light and the transmitted light detected by the second optical sensor, and the reflected image acquired by subtracting a result of the detection of the transmitted light from a result of the detection of the reflected and transmitted light.

7. The optical sorter according to claim 4, wherein only the first light source out of the first light source and the second light source is at least partially on in the first lighting pattern, only the second light source out of the first light source and the second light source is at least partially on in the second lighting pattern, the optical sensor includes a first optical sensor disposed on the first side, the first optical sensor is configured to detect the reflected light based on the first lighting pattern during the first scan period and detect the transmitted light based on the second lighting pattern during the second scan period, and the processor is configured to determine the foreign object and/or the defective product based on at least the reflected image and the transmitted image corresponding to the reflected light and the transmitted light detected by the first optical sensor, and the reflected and transmitted image acquired by adding a result of the detection of the reflected light and a result of the detection of the transmitted light.

8. The optical sorter according to claim 7, wherein the optical sensor includes a second optical sensor disposed on the second side,
- the second optical sensor is configured to detect the transmitted light based on the first lighting pattern during the first scan period and detect the reflected light based on the second lighting pattern during the second scan period, and
- the processor is configured to determine the foreign object and/or the defective product based on at least the transmitted image and the reflected image corresponding to the transmitted light and the reflected light detected by the second optical sensor, and the reflected and transmitted image acquired by adding a result of the detection of the transmitted light and a result of the detection of the reflected light.

9. The optical sorter according to claim 4, wherein the first light and the second light are red light.

10. The optical sorter according to claim 4, wherein the first light source and the second light source are at least partially on in the first lighting pattern,
- only the first light source out of the first light source and the second light source is at least partially on in the second lighting pattern,
- the optical sensor includes a first optical sensor disposed on the first side,
- the first optical sensor is configured to detect the reflected and transmitted light based on the first lighting pattern during the first scan period and detect the reflected light based on the second lighting pattern during the second scan period,
- the second optical sensor is configured to detect the reflected and transmitted light based on the first lighting pattern during the first scan period and detect the transmitted light based on the second lighting pattern during the second scan period, and
- the processor is configured to determine the foreign object and/or the defective product based on at least the reflected and transmitted image and the reflected image corresponding to the reflected and transmitted light and the reflected light detected by the first optical sensor, the reflected and transmitted image and the transmitted image corresponding to the reflected and transmitted light and the transmitted light detected by the second optical sensor, the transmitted image acquired by subtracting a result of the detection of the reflected light by the first optical sensor from a result of the detection of the reflected and transmitted light by the first optical sensor, and the reflected image acquired by subtracting a result of the detection of the transmitted light by the second optical sensor from a result of the detection of the reflected and transmitted light by the second optical sensor.

* * * * *